(12) United States Patent
Takeuchi et al.

(10) Patent No.: US 11,998,972 B2
(45) Date of Patent: Jun. 4, 2024

(54) METHOD AND DEVICE FOR PRODUCING SHRINK-FITTED MEMBER

(71) Applicant: NGK Insulators, Ltd., Nagoya (JP)

(72) Inventors: Fumitaka Takeuchi, Kasugai (JP); Shuhei Kuno, Komaki (JP); Seiya Sawada, Komaki (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 18/151,642

(22) Filed: Jan. 9, 2023

(65) Prior Publication Data
US 2023/0302523 A1 Sep. 28, 2023

(30) Foreign Application Priority Data

Mar. 25, 2022 (JP) ................................ 2022-050609

(51) Int. Cl.
*B21D 53/06* (2006.01)
*F28F 21/04* (2006.01)
*F28F 21/08* (2006.01)

(52) U.S. Cl.
CPC .............. *B21D 53/06* (2013.01); *F28F 21/04* (2013.01); *F28F 21/081* (2013.01); *F28F 2275/00* (2013.01)

(58) Field of Classification Search
CPC ........ B21D 22/02; F28F 21/04; F28F 21/045; F01N 13/18

USPC ..................................................... 29/890.053
See application file for complete search history.

(56) References Cited

FOREIGN PATENT DOCUMENTS

| CN | 103991030 A | * | 8/2014 | ............ B24B 41/06 |
|---|---|---|---|---|
| CN | 113500267 A | * | 10/2021 | |
| JP | 2015199189 A | * | 11/2015 | |
| JP | 6510283 B2 | | 5/2019 | |

OTHER PUBLICATIONS

English Translation of CN 103991030 A (Year: 2014).*
English Translation of CN 113500267 A (Year: 2021).*

* cited by examiner

*Primary Examiner* — Jacob J Cigna
(74) *Attorney, Agent, or Firm* — BURR PATENT LAW, PLLC

(57) ABSTRACT

A method for producing a shrink-fitted member by arranging a hollow type pillar shaped ceramic body inside a metal pipe and shrink-fitting them, the hollow type pillar shaped ceramic body including: an outer peripheral surface and an inner peripheral surface in a direction substantially parallel to an axial direction; and a first end face and a second end face in a direction substantially perpendicular to the axial direction. The method includes arranging the hollow type pillar shaped ceramic body inside the metal pipe while gripping the hollow type pillar shaped ceramic body using a chuck mechanism.

16 Claims, 4 Drawing Sheets

METHOD AND DEVICE FOR PRODUCING SHRINK-FITTED MEMBER

CROSS REFERENCE TO RELATED APPLICATIONS

The present invention claims the benefit of priority to Japanese Patent Application No 2022-050609 filed on Mar. 25, 2022 with the Japanese Patent Office, the entire contents of which are incorporated herein by reference in its entirety.

FIELD OF THE INVENTION

The present invention relates to a method for producing a shrink-fitted member and a devise for producing a shrink-fitted member.

BACKGROUND OF THE INVENTION

Heat exchangers often requires properties such as corrosion resistance. Therefore, ceramic heat exchangers are used. In the chemical and pharmaceutical industries, the heat exchangers are used for heating, cooling and condensing various fluids including acids (bromic acid, sulfuric acid, hydrofluoric acid, nitric acid, hydrochloric acid, etc.), alkalis (caustic alkalis, etc.), halides, saline solutions, organic compounds, and the like. Also, the heat exchangers are used for systems that worm up a coolant, an engine oil and an automatic transmission fluid (ATF: Automatic Transmission Fluid) at an early stage at the time of engine startup to reduce friction losses, or systems that heat an exhaust gas purifying catalyst in order to activate the catalyst at an early stage.

The ceramic heat exchangers include those each having a structure in which a pillar shaped ceramic body is housed in a metal pipe. The heat exchangers having such a structure have an advantage that even if the pillar shaped ceramic body is damaged therein, the fluids are not mixed together.

Known as a method for housing the pillar shaped ceramic body in the metal pipe is a shrink-fitting method in which the metal pipe is heated, and the pillar shaped ceramic body is inserted into a predetermined position in the metal pipe, and then cooled (for example, Patent Literature 1). A device used for the method has a linear motion mechanism for inserting the pillar shaped ceramic body into a predetermined position in the metal pipe, in which a tip portion of the linear motion mechanism and the pillar shaped ceramic body are fixed via a frog type jig, an adhesive, a double-sided tape or the like.

PRIOR ART

Patent Literature

[Patent Literature 1] Japanese Patent No. 6510283 B

SUMMARY OF THE INVENTION

The present invention is specified as follows:
The present invention relates to a method for producing a shrink-fitted member by arranging a hollow type pillar shaped ceramic body inside a metal pipe and shrink-fitting them, the hollow type pillar shaped ceramic body comprising: an outer peripheral surface and an inner peripheral surface in a direction substantially parallel to an axial direction; and a first end face and a second end face in a direction substantially perpendicular to the axial direction, wherein the method comprises arranging the pillar shaped ceramic body inside the metal pipe while gripping the pillar shaped ceramic body using a chuck mechanism, the chuck mechanism comprising: gripping portions capable of gripping at least a part of the inner peripheral surface of the pillar shaped ceramic body; and protruded portions each having a surface capable of being in contact with at least a part of the first end face of the pillar shaped ceramic body.

The present invention also relates to a device for producing a shrink-fitted member by arranging a hollow type pillar shaped ceramic body inside a metal pipe and shrink-fitting them, the pillar shaped ceramic body comprising: an outer peripheral surface and an inner peripheral surface in a direction substantially parallel to an axial direction; and a first end face and a second end face in a direction substantially perpendicular to the axial direction,
wherein the device comprises:
an arm drivable in the axial direction of the metal pipe;
a chuck mechanism provided at a tip of the arm, the chuck mechanism comprising: gripping portions capable of gripping at least a part of the inner peripheral surface of the pillar shaped ceramic body; and protruded portions each having a surface capable of being in contact with at least a part of the first end face of the pillar shaped ceramic body; and
a heating mechanism for heating the metal pipe.

DETAILED DESCRIPTION OF THE INVENTION

Figure 1:
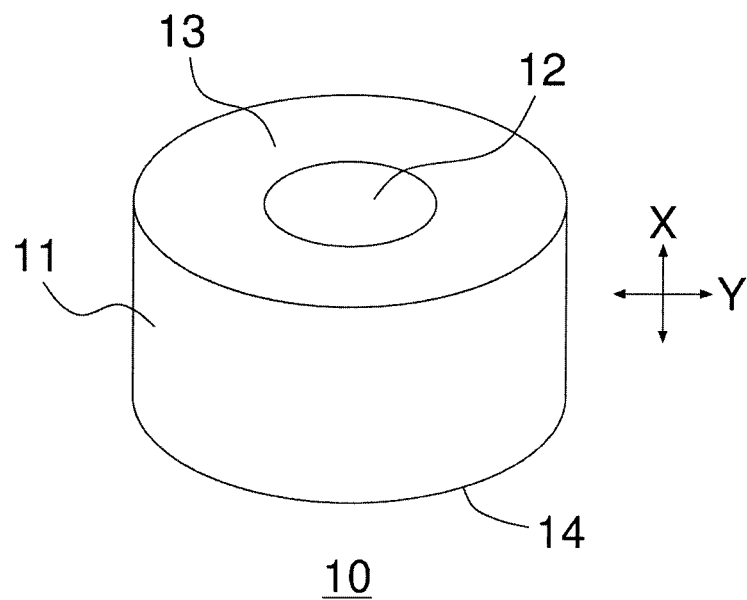
FIG. 1 is a perspective view of a hollow type pillar shaped ceramic body.

The fixing method using the frog type jig is limited to a case where the pillar shaped ceramic body is a honeycomb structure. Further, since it fixes the honeycomb structure by fitting frogs of the frog type jig into cells of the honeycomb structure, the shapes and sizes of the frogs have to be changed depending on the shapes and sizes of the cells, and it is also difficult to adjust the force when inserting them into the cells of the honeycomb structure.

Furthermore, the fixing method using the double-sided tape or the adhesive tends to result in a reduced adhesive force due to heat of the heated metal pipe, so that the pillar shaped ceramic body may be shrink-fitted in a inclined state. In addition, since double-sided tape and the adhesive tend to result in the decreased adhesive force, leading to frequent use of the double-sided tape or the adhesive.

The present invention has been made to solve the problems as described above. An object of the present invention is to provide a method and device for a shrink-fitted member which can easily and stably arranging a hollow type pillar shaped ceramic body at a predetermined position inside a metal pipe and which can produce a shrink-fitted member having high productivity and high quality at low cost.

According to the present invention, it is possible to provide a method and device for a shrink-fitted member which can easily and stably arranging a hollow type pillar shaped ceramic body at a predetermined position inside a metal pipe and which can produce a shrink-fitted member having high productivity and high quality at low cost.

Hereinafter, embodiments of the present invention will be specifically described with reference to the drawings as needed. It is to understand that the present invention is not limited to the following embodiments, and those which appropriately added changes, improvements and the like to the following embodiments based on knowledge of a person skilled in the art without departing from the spirit of the present invention fall within the scope of the present invention.

(1) Method for Producing Shrink-Fitted Member

A method for producing a shrink-fitted member according to an embodiment of the present invention is carried out by arranging a hollow type pillar shaped ceramic body (which may, hereinafter, be abbreviated as a "pillar shaped ceramic body") inside a metal pipe and shrink-fitting them. The production method has a feature of arranging the pillar shaped ceramic body inside the metal pipe while gripping the pillar shaped ceramic body using a chuck mechanism. Features other than this can be carried out according to methods known in the art.

First, the metal pipe and the hollow type pillar shaped ceramic body used for the production method will be described.

<Metal Pipe>

The metal pipe preferably has heat resistance and corrosion resistance, although not particularly limited thereto. Examples of the metal pipe include stainless steel pipes, copper pipes, brass pipes, titanium pipes, Ni alloy pipes, Al alloy pipes, and the like. Also, as the metal pipe, a joint pipe obtained by joining two or more of the various types of pipes exemplified above may be used.

When the shrink-fitted member is used for a heat exchanger, the metal pipe preferably should not fall off from the pillar shaped ceramic body due to a difference between thermal expansion coefficients of the metal pipe and the pillar shaped ceramic body during heat exchange.

A shape of the metal pipe is not particularly limited as long as it is a shape that can allow the pillar shaped ceramic body to be inserted into the metal pipe, and it may be various shapes such as a cylindrical shape and a rectangular cylindrical shape. Further, the metal pipe may be a straight pipe having a uniform diameter in the axial direction, or may be a pipe other than the straight pipe. The pipe other than the straight pipe is a pipe configured such that the diameter varies in the axial direction, including decreased and/or increased diameter pipes each partially having a tapered portion, for example.

<Hollow Type Pillar Shaped Ceramic Body>

The hollow type pillar shaped ceramic body is made of ceramics and formed into a pillar shape, and has a hollow portion at a central portion in a cross section perpendicular to the axial direction. The pillar shape is not limited to a cylindrical shape, and it may be a shape in which the cross section perpendicular to the axial direction (the extending direction of the flow path) has an elliptical shape, or an oval shape formed by combining arcs, a quadrangular shape, or other polygonal shape.

Here, referring to FIG. 1, it shows a perspective view of a hollow type pillar shaped ceramic body. As shown in FIG. 1, a hollow type pillar shaped ceramic body 10 includes: an outer peripheral surface 11 and an inner peripheral surface 12 in a direction substantially parallel to an axial direction X; and a first end face 13 and a second end face 14 in a direction Y substantially perpendicular to the axial direction X.

As used herein, the expression "substantially parallel" refers to a state that is within ±10°, preferably within 5°, from the parallel direction. Moreover, the expression "substantially perpendicular" refers to a state that is within ±10°, preferably within 5°, from the perpendicular direction.

The hollow type pillar shaped ceramic body preferably has a thermal conductivity of 50 W/(m·K) or more at 25° C., and more preferably from 100 to 300 W/(m·K), and even more preferably from 120 to 300 W/(m K). The thermal conductivity of the hollow type pillar shaped ceramic body in such a range can lead to an improved thermal conductivity and can allow the heat inside the hollow type pillar shaped ceramic body to be efficiently transmitted to the outside. It should be noted that the value of thermal conductivity is a value measured according to the laser flash method (JIS R 1611:1997).

The hollow type pillar shaped ceramic body 10 is based on ceramics. The phrase "based on ceramics" means that a ratio of a mass of ceramics to the total mass is 50% by mass or more.

The hollow type pillar shaped ceramic body 10 is preferably based on SiC (silicon carbide) having high thermal conductivity. The phrase "based on SiC (silicon carbide)" means that a ratio of a mass of SiC (silicon carbide) to the total mass is 50% by mass or more.

More particularly, the material of the hollow type pillar shaped ceramic body 10 that can be used herein includes Si—SiC materials such as Si-impregnated SiC and (Si+Al) impregnated SiC, metal composite SiC, recrystallized SiC, $Si_3N_4$, SiC, and the like. Among them, the Si—SiC material is preferably used, because it can be produced at a lower cost, and has high thermal conductivity.

The hollow type pillar shaped ceramic body 10 is preferably a honeycomb structure.

Figure 2:
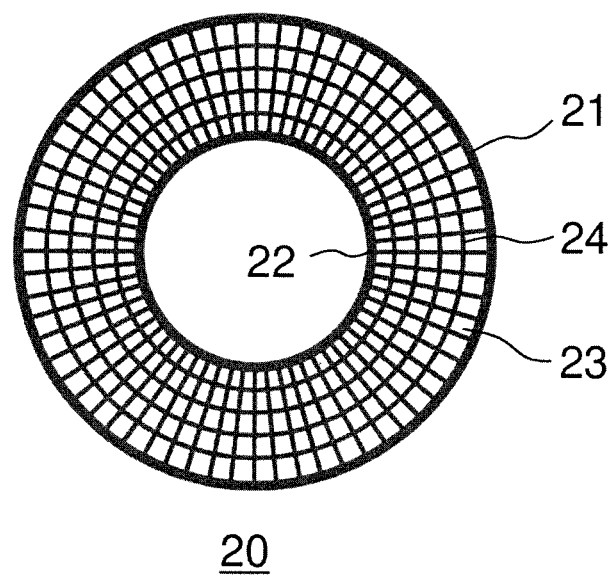
FIG. 2 is a cross-sectional view of a honeycomb structure, which is perpendicular to an axial direction.

Here, FIG. 2 shows a cross-sectional view of a typical honeycomb structure, which is perpendicular to the axial direction X.

A honeycomb structure 20 as shown in FIG. 2 includes: an outer peripheral wall 21; an inner peripheral wall 22; and a partition wall 24 arranged between the outer peripheral wall 21 and the inner peripheral wall 22, and defining a plurality of cells 23 each extending from a first end face to a second end face. By having the partition wall 24, the honeycomb structure 20 can efficiently collect heat from a fluid flowing through the cells 23 and transfer it to the outside.

The shape of each cell 23 in the cross section perpendicular to the axial direction X of the honeycomb structure 20 is not limited to the illustrated shape, and it may be circular, elliptical, or polygonal such as triangular, or the like.

A cell density (that is, the number of cells 23 per unit area) in the cross section of the honeycomb structure 20 perpendicular to the axial direction is not particularly limited. The cell density may be adjusted as needed depending on the applications and the like, and it may preferably be in a range of from 4 to 320 cells/cm$^2$. The cell density of 4 cells/cm$^2$ or more can sufficiently ensure the strength of the partition wall 24, hence the strength of the honeycomb structure 20 itself and effective GSA (geometrical surface area). Further, the cell density of 320 cells/cm$^2$ or less can allow an increase in a pressure loss to be prevented when the fluid flows.

The thickness of the partition wall 24 of the honeycomb structure 20 may be appropriately designed depending on the purposes, and is not particularly limited. The thickness of the partition wall 24 is preferably 50 μm to 2 mm, and more preferably 60 μm to 600 μm. The thickness of the partition wall 24 of 50 μm or more can result in improved mechanical strength to prevent damages due to impact or thermal stress. On the other hand, the thickness of the partition wall 24 of 2 mm or less reduces a pressure loss of the fluid due to an increased proportion of the cell volume in the honeycomb structure 20, so that the heat exchange efficiency can be improved.

The thicknesses of the outer peripheral wall 21 and the inner peripheral wall 22 of the honeycomb structure 20 may also be appropriately designed depending on to the purposes, and are not particularly limited. When the shrink-fitted member is used for general heat exchange applications, the thickness of each of the outer peripheral wall 21 and the inner peripheral wall 22 is preferably more than 0.3 mm and 10 mm or less, and more preferably from 0.5 mm to 5 mm, and even more preferably from 1 mm to 3 mm. Moreover, when the shrink-fitted member is used for a thermal storage application, the thickness of the outer peripheral wall 21 is preferably 10 mm or more, in order to increase a heat capacity of the outer peripheral wall 21.

Each of the outer peripheral wall 21, the inner peripheral wall 22 and the partition wall 24 preferably has a porosity of 10% or less, and more preferably 5% or less, and even more preferably 3% or less. Further, the porosity of the outer peripheral wall 21, the inner peripheral wall 22 and the partition wall 24 may be 0%. The porosity of the outer peripheral wall 21, the inner peripheral wall 22 and the partition wall 24 of 10% or less can lead to improvement of thermal conductivity.

The honeycomb structure 20 preferably has an isostatic strength of more than 100 MPa, and more preferably 150 MPa or more, and more preferably 200 MPa or more. The isostatic strength of the honeycomb structure 20 of more than 100 MPa can lead to the honeycomb structure 20 having improved durability. The isostatic strength of the honeycomb structure 20 can be measured according to the method for measuring isostatic breakdown strength as defied in the JASO standard M 505-87 which is a motor vehicle standard issued by Society of Automotive Engineers of Japan, Inc.

The hollow type pillar shaped ceramic body 10 can be produced by a method known in the art. The method for producing the honeycomb structure 20 will be described as an example of the specific methods for producing the hollow type pillar shaped ceramic body 10.

First, a green body containing ceramic powder is extruded into a desired shape to prepare a honeycomb formed body. At this time, the shape and density of the cells 23, the number, length and thickness of the partition wall 24, the shapes and the thicknesses of the outer peripheral wall 21 and the inner peripheral wall 22 and the like, can be controlled by selecting dies and jig in appropriate forms. The material of the honeycomb formed body that can be used herein includes the ceramics as described above. For example, when producing a honeycomb formed body based on a Si-impregnated SiC composite, a binder and water or an organic solvent can be added to a predetermined amount of SiC powder, and the resulting mixture can be kneaded to form a green body, which can be formed into a honeycomb formed body having a desired shape. The resulting honeycomb formed body can be then dried, and the honeycomb formed body can be impregnated with metal Si and fired under reduced pressure in an inert gas or vacuum to obtain the honeycomb structure 20.

The method for producing the shrink-fitted member according to an embodiment of the present invention is carried out using the metal pipe and the hollow type pillar shaped ceramic body 10 as described above. More particularly, the production method is carried out by heating the metal pipe, arranging the hollow type pillar shaped ceramic body 10 inside the heated metal pipe, and shrink-fitting them.

The heating of the metal pipe is performed by placing the metal pipe inside a heating means and then heating it with the heating means. The heating means is not particularly limited as long as it can heat the metal pipe from the outer peripheral side of the metal pipe, and a heater, an induction heating device, or the like may be used.

The bottom portion of the position where the metal pipe is arranged may be provided with a protruding jig. The protruding jig is a jig that has a function of determining the position of the hollow type pillar shaped ceramic body 10 in the metal pipe in addition to the arrangement position of the metal pipe. Therefore, the protruding jig has a structure for obtaining such a function. For example, the protruding jig has a width (horizontal length) smaller than a pipe inner diameter of one end portion of the metal pipe so that the one end portion side of the metal pipe can be covered. Also, it has a height (vertical length) corresponding to a predetermined position so that the hollow type pillar shaped ceramic body 10 can be arranged at the predetermined position in the metal pipe. Furthermore, it has a width (horizontal length) smaller than the diameter of the hollow type pillar shaped ceramic body 10 so that the shrink-fitted member can be removed after the shrink-fitting step. If the metal pipe is not cylindrical (for example, if it has a rectangular cylindrical shape), the pipe inner diameter of one end portion of the metal pipe refers to a diameter of the maximum inscribed circle that is in contact with an inner circumference of the one end portion of the metal pipe.

The outer shape of the protruding jig can be set as needed depending on the shape of the metal pipe. For example, when the metal pipe is cylindrical, the outer shape of the protruding jig may be various shapes such as a cylindrical shape or a prismatic shape, but the cylindrical shape is preferable. Further, when the metal pipe has a rectangular cylindrical shape, the outer shape of the protruding jig may have various shapes such as a cylindrical shape or a prismatic shape, but the prismatic shape is preferable.

The protruding jig may have protruded portions that can be inserted into the hollow portion of the hollow type pillar shaped ceramic body 10. The use of the protruding jig having the protruded portions can provide improved positioning accuracy of the hollow type pillar shaped ceramic body in the step of arranging the pillar shaped ceramic body.

The material of the protruding jig is not particularly limited as long as it is made of a material that can withstand the heating temperature during the shrink-fitting step. Examples of such a material include alumina and the like.

The hollow type pillar shaped ceramic body 10 is gripped using a chuck mechanism and arranged at a predetermined position inside the heated metal pipe.

Figure 3:
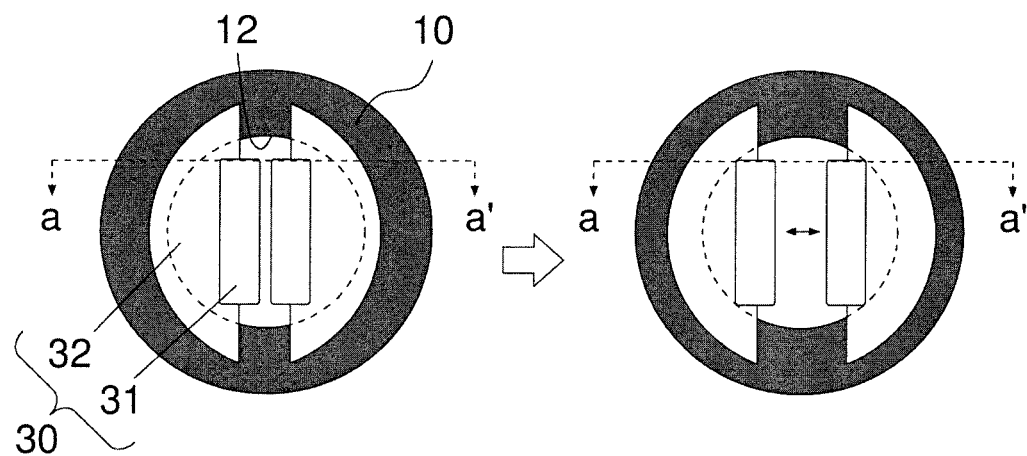
FIG. 3 is a top view for explaining a chuck mechanism.
Figure 4:
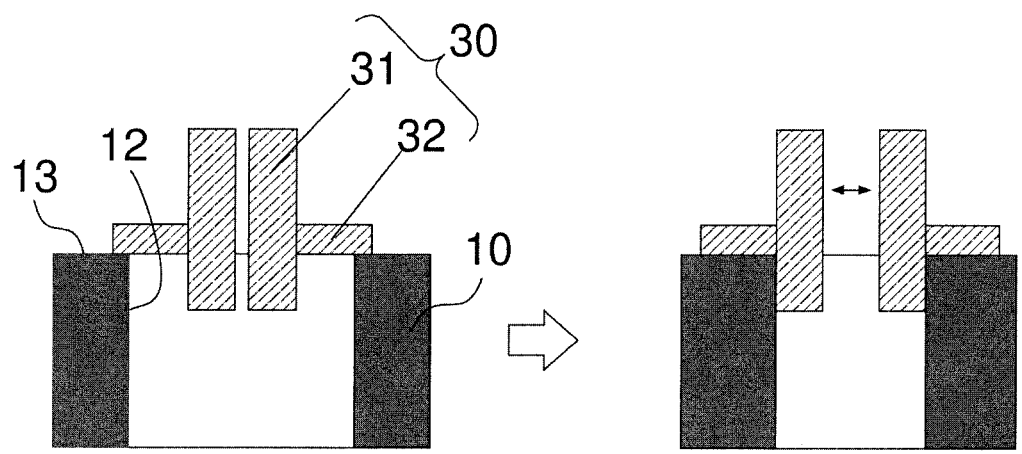
FIG. 4 is a cross-sectional view taken along the line a-a' in FIG. 3.

Here, a top view for explaining the chuck mechanism is shown in FIG. 3, and a cross-sectional view is shown in FIG. 4. It should be noted that FIG. 4 is a cross-sectional view taken along the line a-a' in FIG. 4.

As shown in FIGS. 3 and 4, the chuck mechanism 30 includes gripping portions 31 and protruded portions 32.

The gripping portions 31 are configured to be able to grip at least a part of the inner peripheral surface 12 of the hollow type pillar shaped ceramic body 10. Further, each protruded portion 32 has a surface (for example, a flat surface) that can be in contact with at least a part of the first end face 13 of the hollow type pillar shaped ceramic body 10. By gripping the hollow type pillar shaped ceramic body 10 using the chuck mechanism 30 having the gripping portions 31 and the projected portions 32 having such structures, the hollow type pillar shaped ceramic body 10 can be easily and stably arranged at the predetermined position in the metal pipe, so that the shrink-fitted member having high productivity and quality can be produced at low cost.

The materials of the chuck mechanism 30 (the gripping portions 31 and the protruded portions 32) are not particularly limited as long as they are made of a material that can withstand the heating temperature during the shrink-fitting step.

The chuck mechanism 30 can grip the hollow type pillar shaped ceramic body 10 by opening the two gripping portions 31 (that is, moving the two gripping portions 31 in the direction Y so as to be brought into contact with the inner peripheral surface 12 of the hollow type pillar shaped ceramic body 10). Conversely, the chuck mechanism 30 can separate the hollow type pillar shaped ceramic body 10 from the two gripping portions 31 by closing the two gripping portions 31 (that is, moving the two gripping portions 31 in the direction Y so as not to be brought into contact with the inner peripheral surface 12 of the hollow type pillar shaped ceramic body 10).

The gripping portions 31 can be configured to be in line contact and/or in surface contact with the inner peripheral surface 12 of the hollow type pillar shaped ceramic body 10. Such contact enables the hollow type pillar shaped ceramic body 10 to be stably gripped by the gripping portions 31.

Here, each of FIGS. 3 and 4 is an example of the case where the gripping portions 31 are in line contact with the inner peripheral surface 12 of the hollow type pillar shaped ceramic body 10.

Figure 5:
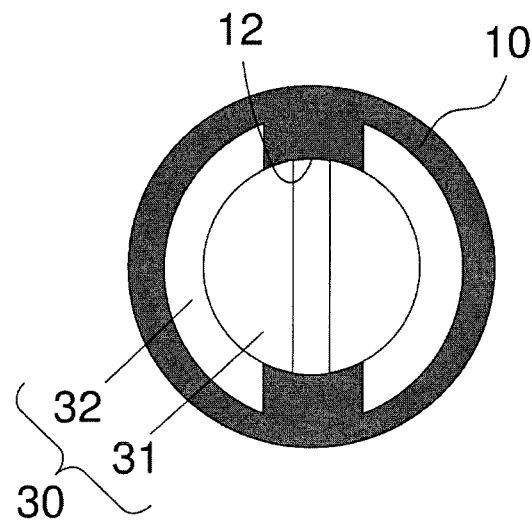
FIG. 5 is a top view for explaining a chuck mechanism.
Figure 6:
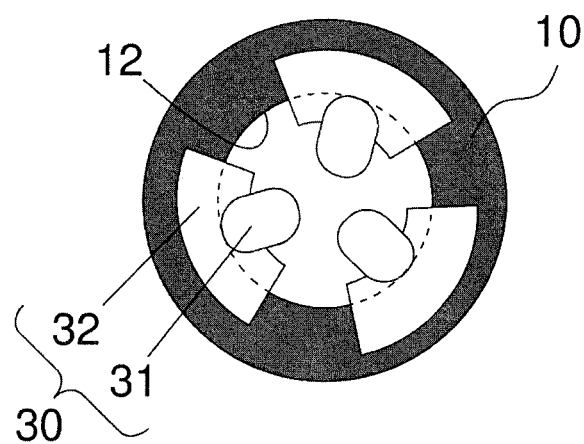
FIG. 6 is a top view for explaining other chuck mechanism.

Also, each of FIGS. 5 and 6 shows an example in which the gripping portions 31 are in surface contact with the inner peripheral surface 12 of the hollow type pillar shaped ceramic body 10. Each of FIGS. 5 and 6 corresponds to the same top view as FIG. 3. The surface of each gripping portion 31 that is in surface contact with the inner peripheral surface 12 of the hollow type pillar shaped ceramic body 10 can have the same curved surface as the inner peripheral surface 12 of the hollow type pillar shaped ceramic body 10.

Although not shown, the gripping portions 31 and the inner peripheral surface 12 of the hollow type pillar shaped ceramic body 10 may be in contact with each other both in line contact and in surface contact.

It is preferable that there are two or more positions that are in line contact. By thus providing two or more positions for line contact, the hollow type pillar shaped ceramic body 10 can be stably gripped by the gripping portions 31.

Here, each of FIGS. 3 and 4 is an example of the case where there are four positions that are in line contact. By changing the number and shape of the gripping portions 31, the number of the positions that are in line contact can be changed.

It is preferable that there are two or more positions that are in surface contact. By thus providing two or more positions that are in surface contact, the hollow type pillar shaped ceramic body 10 can be stably gripped by the gripping portions 31.

Here, FIG. 5 is an example of the case where there are two positions that are in surface contact, and FIG. 6 is an example of the case where there are three positions that are in surface contact. By changing the number and shape of the gripping portions 31, the number of the positions that are in surface contact can be changed.

It is preferable that an angle formed by each gripping portion 31 and each protruded portion 32 is substantially the same as an angle formed by the inner peripheral surface 12 and the first end face 13 of the hollow type pillar shaped ceramic body 10. By thus controlling the angle formed by the gripping portion 31 and the protruded portion 32, no gap is generated between the protruded portion 32 and the first end face 13, which can prevent the hollow type pillar shaped ceramic body 10 from being grasped in an inclined state.

As used herein, the expression "substantially the same" means a difference between the angle formed by the gripping portion 31 and the protruded portion 32 and the angle formed by the inner peripheral surface 12 and the first end face 13 of the hollow type pillar shaped ceramic body 10 is within ±1°.

Each protruded portion 32 may have a suction mechanism.

Figure 7:
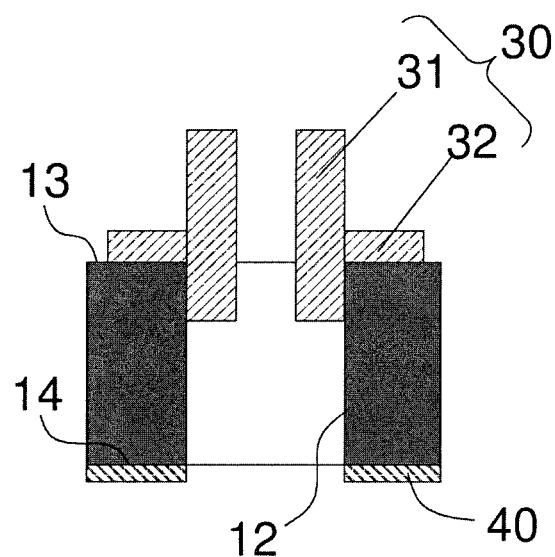
FIG. 7 is a cross-sectional view for explaining a chuck mechanism provided with protruded portions each having a suction mechanism.

Here, FIG. 7 is a cross-sectional view for explaining a state where the hollow type pillar shaped ceramic body 10 is gripped using the chuck mechanism 30 having the protruded portions 32 each having the suction mechanism. FIG. 7 corresponds to the same cross section as the cross section taken along the line a-a' in FIG. 3.

As shown in FIG. 7, each protruded portion 32 has the suction mechanism (not shown), auxiliary members 40 are arranged on the second end face 14 opposing to the first end face 13 of the hollow type pillar shaped ceramic body 10 that is in contact with the protruded portions 32, and suction force of the protruded portions 32 can help to grip the hollow type pillar shaped ceramic body 10. By thus using the suction mechanisms of the protruded portions 32, the hollow type pillar shaped ceramic body 10 can be more stably gripped.

The protruded portions 32 may be made of a magnetic material.

Figure 8:
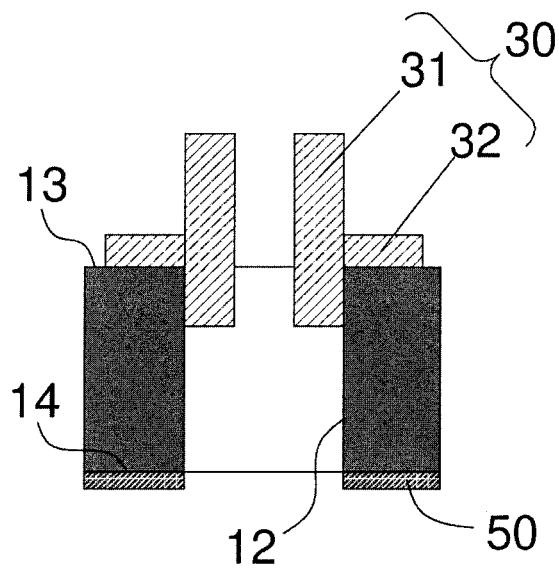
FIG. 8 is a cross-sectional view for explaining a chuck mechanism having protruded portions made of a magnetic material.

FIG. 8 is a cross-sectional view for explaining a state where the hollow type pillar shaped ceramic body 10 is gripped using the chuck mechanism 30 having the protruded portions 32 made of the magnetic material. FIG. 8 corresponds to the same section as the cross section taken along the line a-a' in FIG. 3.

As shown in FIG. 8, the protruded portions 32 are made of the magnetic material, and auxiliary members 50 are arranged on the second end face 14 opposing to the first end face 13 of the hollow type pillar shaped ceramic body 10 that is in contact with the protruded portions 32, and magnetic force between the protruded portions 32 and the auxiliary members 50 can help to grip the hollow type pillar shaped ceramic body 10. By thus using the magnetic force between the protruded portions 32 and the auxiliary members 50, the hollow type pillar shaped ceramic body 10 can be more stably gripped.

Although not shown, the chuck mechanism 30 is connected to a tip of an arm that can be driven in the axial direction X of the metal pipe. Also, the arm is connected to a drive mechanism (not shown). The arm and drive mechanism are not particularly limited, and known members may be used.

After arranging the hollow type pillar shaped ceramic body 10 at the predetermined position in the heated metal pipe, the metal pipe is cooled, so that the diameter of the metal pipe is decreased to shrink-fit the metal pipe to the hollow type pillar shaped ceramic body 10.

The shrink-fitted member obtained as described above includes the metal pipe and the hollow type pillar shaped ceramic body 10 housed in the metal pipe. The shrink-fitted member having such a structure can be used for various applications that require corrosion resistance, thermal conductivity, and the like. Among these, the shrink-fitted member is suitable for use as a heat conductive member used in the heat exchangers.

(2) Device for Producing Shrink-Fitted Member

The device for producing the shrink-fitted member according to an embodiment of the present invention is suitable for performing the method for producing the shrink-fitted member as described above, and is a device for arranging the hollow type pillar shaped ceramic body 10 inside the metal pipe and shrink-fitting them.

The production device includes: an arm drivable in an axial direction of a metal pipe; a chuck mechanism 30 including gripping portions 31 provided at a tip of the arm capable of gripping at least a part of an inner peripheral surface 12 of a hollow type pillar shaped ceramic body 10 and protruding portions 32 each having a surface (for example, flat surface) capable of being in contact with at least a part of a first end face 13 of the hollow type pillar shaped ceramic body 10; and a heating mechanism for heating the metal pipe. The production device having such a structure can allow the hollow type pillar shaped ceramic body 10 to be easily and stably arranged at the predetermined position in the metal pipe, thereby producing a shrink-fitted member having high productivity and quality at low cost.

It should be noted that the structure of each member making up the production device has been described in the method for producing the shrink-fitted member, so descriptions thereof will be omitted.

DESCRIPTION OF REFERENCE NUMERALS 10 hollow type pillar shaped ceramic body
11 outer peripheral surface
12 inner peripheral surface
13 first end face
14 second end face
20 honeycomb structure
21 outer peripheral wall
22 inner peripheral wall
23 cell
24 partition wall
30 chuck mechanism
31 gripping portion
32 protruded portion
40, 50 auxiliary member

The invention claimed is:

1. A method for producing a shrink-fitted member by arranging a hollow type pillar shaped ceramic body inside a metal pipe and shrink-fitting them, the hollow type pillar shaped ceramic body comprising: an outer peripheral surface and an inner peripheral surface in a direction substantially parallel to an axial direction; and a first end face and a second end face in a direction substantially perpendicular to the axial direction,
wherein the method comprises arranging the pillar shaped ceramic body inside the metal pipe while gripping the pillar shaped ceramic body using a chuck mechanism, the chuck mechanism comprising: gripping portions capable of gripping at least a part of the inner peripheral surface of the pillar shaped ceramic body; and protruded portions each having a surface capable of being in contact with at least a part of the first end face of the pillar shaped ceramic body.

2. The method according to claim 1, wherein the gripping portions are configured such that the gripping portions can be in line contact and/or in surface contact with the inner peripheral surface of the pillar shaped ceramic body.

3. The method according to claim 2, wherein there are two or more positions that are in line contact.

4. The method according to claim 2, wherein there are two or more positions that are in surface contact.

5. The method according to claim 1, wherein an angle formed by each of the gripping portions and each of the protruded portions is substantially the same as an angle formed by the inner peripheral surface and the first end face of the pillar shaped ceramic body.

6. The method according to claim 1, wherein each of the protruded portion has a suction mechanism, and auxiliary members are arranged on the second end face opposing to the first end face of the pillar shaped ceramic body, the first end face being in contact with the protruded portions, and suction force of the protruded portions helps to grip the pillar shaped ceramic body.

7. The method according to claim 1, wherein the protruded portions are made of a magnetic material, and auxiliary members are arranged on the second end face opposing to the first end face of the pillar shaped ceramic body, the first end face being in contact with the protruded portions, and magnetic force between the protruded portions and the auxiliary members helps to grip the hollow type pillar shaped ceramic body.

8. The method according to claim 1, wherein the pillar shaped ceramic body is a honeycomb structure comprising: an outer peripheral wall; an inner peripheral wall; and a partition wall arranged between the outer peripheral wall and the inner peripheral wall, the partition wall defining a plurality of cells each extending from a first end face to a second end face.

9. The method according to claim 1, wherein the shrink-fitted member is a heat conductive member.

10. A device for producing a shrink-fitted member by arranging a hollow type pillar shaped ceramic body inside a metal pipe and shrink-fitting them, the pillar shaped ceramic body comprising: an outer peripheral surface and an inner peripheral surface in a direction substantially parallel to an axial direction; and a first end face and a second end face in a direction substantially perpendicular to the axial direction,
wherein the device comprises:
an arm drivable in the axial direction of the metal pipe;
a chuck mechanism provided at a tip of the arm, the chuck mechanism comprising: gripping portions capable of gripping at least a part of the inner peripheral surface of the pillar shaped ceramic body; and protruded portions each having a surface capable of being in contact with at least a part of the first end face of the pillar shaped ceramic body; and
a heating mechanism for heating the metal pipe.

11. The device according to claim 10, wherein the gripping portions are configured such that the gripping portions can be in line contact and/or in surface contact with the inner peripheral surface of the pillar shaped ceramic body.

12. The device according to claim 11, wherein there are two or more positions that are in line contact.

13. The device according to claim 11, wherein there are two or more positions that are in surface contact.

14. The device according to claim 10, wherein an angle formed by each of the gripping portions and each of the protruded portions is substantially the same as an angle formed by the inner peripheral surface and the first end face of the pillar shaped ceramic body.

15. The device according to claim 10, wherein each of the protruded portion has a suction mechanism, and auxiliary members are arranged on the second end face opposing to the first end face of the pillar shaped ceramic body, the first end face being in contact with the protruded portions, and suction force of the protruded portions helps to grip the pillar shaped ceramic body.

16. The device according to claim 10, wherein the protruded portions are made of a magnetic material, and auxiliary members are arranged on the second end face opposing to the first end face of the pillar shaped ceramic body, the first end face being in contact with the protruded portions, and magnetic force between the protruded portions and the auxiliary members helps to grip the hollow type pillar shaped ceramic body.

\* \* \* \* \*